(No Model.)

J. ASKINS.
LOCK FOR BICYCLES.

No. 556,240. Patented Mar. 10, 1896.

Witnesses.
Robert Garrett.
Dennis Sumby.

Inventor.
Joseph Askins.
By James L. Norris.
Atty.

UNITED STATES PATENT OFFICE.

JOSEPH ASKINS, OF LIMA, OHIO.

LOCK FOR BICYCLES.

SPECIFICATION forming part of Letters Patent No. 556,240, dated March 10, 1896.

Application filed July 11, 1895. Serial No. 555,615. (No model.)

*To all whom it may concern:*

Be it known that I, JOSEPH ASKINS, a citizen of the United States, residing at Lima, in the county of Allen and State of Ohio, have invented new and useful Improvements in Locks for Bicycles, &c., of which the following is a specification.

This invention relates to locks for wheeled vehicles—such as bicycles, tricycles, and the like — wherein sprocket-wheels and chain belts are employed to rotate the drive-wheels.

The object of the present invention is to provide a new and improved sprocket-wheel for driving a chain belt, whereby the latter may be locked whenever desired to prevent the practicable rotation of the sprocket-wheel and the movement of the chain belt.

The invention also has for its object to provide novel, simple, efficient, and economical means for locking a chain belt and a sprocket-wheel together for the purpose of preventing the practicable use of a bicycle or other vehicle until the locking device is unlocked.

To accomplish these objects my invention consists essentially in a wheel adapted to drive a belt and provided with a radially-movable pin or sprocket and a suitable lock for locking the pin or sprocket retracted or projected in such manner that when the pin or sprocket is projected the belt and the wheel are locked together and practicable movement of these parts is prevented until the pin or sprocket is retracted.

The invention also consists in the features of construction and the combination or arrangement of parts hereinafter described and claimed, reference being made to the accompanying drawings, in which—

Figure 1:
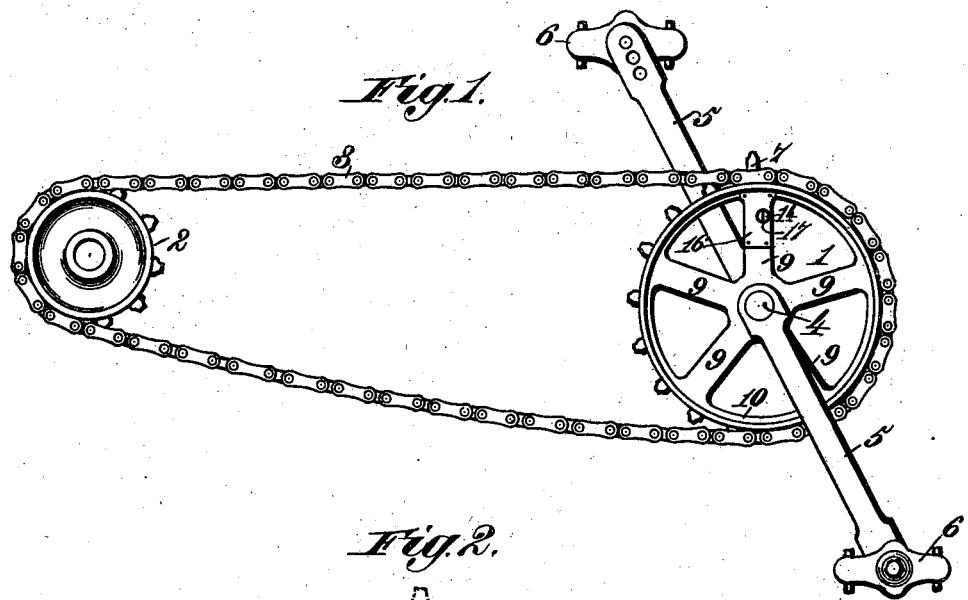
Figure 2:
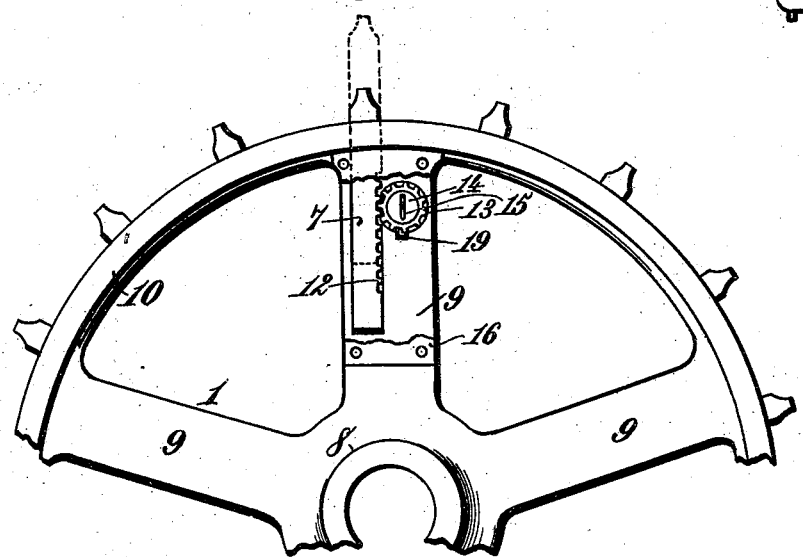
Figure 3:
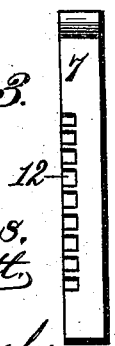
Figure 4:
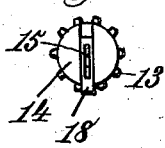
Figure 5:
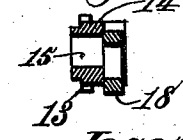

Figure 1 is a side elevation showing two sprocket-wheels connected by a chain belt and one of the sprocket-wheels provided with my invention. Fig. 2 is a sectional side elevation of a portion of the sprocket-wheel having the radially-movable pin or sprocket. Fig. 3 is a detail edge view of the radially-movable pin or sprocket, and Figs. 4 and 5 are detail views of the devices for moving the pin or sprocket and locking the same retracted or projected.

In order to enable those skilled in the art to make and use my invention, I will now describe the same in detail, referring to the drawings, wherein—

The numerals 1 and 2 indicate two sprocket-wheels connected by a chain belt composed of flexibly-connected links 3, of any ordinary or suitable construction. The sprocket-wheels and chain belt may be employed to operate a bicycle, a tricycle, or any other wheeled vehicle.

If the invention is applied to a bicycle, the sprocket-wheel 1 is mounted on a shaft 4, having cranks 5 and pedals 6, so that the feet of the rider can be employed to rotate the sprocket-wheel and impart movement to the chain belt for rotating the drive-wheel.

In bicycles and tricycles it is desirable to provide simplified means for locking the operative parts, so that practicable use of the bicycle or tricycle is impossible until the parts are unlocked. To accomplish this purpose through the medium of simple, efficient, and economical devices, I provide the sprocket-wheel 1 with a radially-movable pin 7, which may be one of the sprockets of the sprocket-wheel, or may be a specially-constructed pin applied for the purpose of locking the chain belt and the sprocket-wheels together, as will hereinafter appear.

The wheel itself maybe of any ordinary or suitable construction, but, as shown in the drawings, it comprises a hub 8, spokes 9, and a rim 10, from which project the sprockets. The outer end of the pin or sprocket 7 is of substantially the same construction or form as the sprockets of the wheel, and it is adapted to enter and operate upon the links of the chain belt in the same manner as the rigid sprockets of the wheel. The pin or sprocket 7 is adapted to be projected and retracted in such manner that when retracted it will operate practicably to impart motion to the chain belt, but when projected beyond its normal position it will extend through one of the links of the chain belt to such extent that the latter cannot pass off of the pin or sprocket, as is essential for the practicable operation of the chain belt when the sprocket-wheel is rotated.

The radially-movable pin or sprocket is adapted to be locked in either its retracted or projected position, and this may be accomplished through the medium of any suitable locking devices. In the present example of my invention the radially-movable pin or sprocket 7 is constructed in one rectilinear edge with a small rack 12, meshing with a pinion 13, formed with or otherwise provided on a circular hub 14, suitably journaled in a chamber in one of the spokes 9, so that when the pinion is rotated the pin or sprocket is retracted or projected, according to the direction in which the pinion is turned. The hub 14 is constructed with a keyhole-slot 15, and a plate 16, which covers the chamber provided in the spoke to receive the parts referred to, is provided with a hole 17 for the hub, so that a flat or other key adapted to the keyhole-slot can be introduced for the purpose of rotating the hub and pinion. The rotation of the pinion moves the pin or sprocket 7 inward or outward, according to the direction in which the pinion is turned, as before stated; and for the practicable use of the parts as a lock it is necessary to retain the pinion in a fixed position after the desired adjustment of the pin or sprocket 7 is effected. This is conveniently accomplished through the medium of a sliding bolt or dog 18, movable radially in the hub 14 and adapted to engage a locking-notch 19, provided in the spoke 9. The bolt or dog 18 is preferably of the gravity type—that is to say, it will fall by gravity into engagement with the locking-notch 19; but obviously the bolt or dog may be thrown into engagement with the locking-notch by means of any suitable spring without affecting the spirit of my invention. Inasmuch as the spring is a common expedient I do not deem it necessary to illustrate the same in the drawings.

The bolt or dog 18 is designed to be withdrawn from the locking-notch 19 by the action of a key when the latter is inserted into the keyhole-slot of the hub 14, so that when the key is inserted the bolt or dog is withdrawn from the locking-notch, and the pinion and hub can be rotated by turning the key for the purpose of projecting the pin or sprocket 7. A single complete revolution of the pinion and hub will place the bolt or dog in position to engage the locking-notch 19 when the key is withdrawn, and consequently the pin or sprocket 7 will be rigidly locked in its projected position. As before stated, when the pin or sprocket 7 is projected it extends through a link of the chain belt to such extent that the said link of the chain belt cannot move off of or disengage itself from the pin or sprocket, as is necessary for the practicable operation of the chain belt in connection with the sprocket-wheel when the latter is rotated. Therefore when the pin or sprocket is projected in the manner stated the chain belt and the sprocket-wheel are locked together, and the practicable operation of the chain belt and sprocket-wheel is rendered impossible until the locking devices are unlocked, or until the pin or sprocket is retracted to its normal position to operate as an ordinary sprocket.

The invention is particularly designed as a lock for bicycles, but will be found useful in connection with tricycles or other wheeled vehicles, or wherever sprocket-wheels and chain belts are employed and it is desirable to lock one of the sprocket-wheels and the chain belt together for any purpose whatever.

My invention provides very simplified devices for locking a bicycle when the same is not in use by the rider, thus preventing unauthorized persons from surreptitiously using the bicycle.

I do not wish to be understood as confining myself to any particular locking devices for holding the pin or sprocket retracted or projected, as any devices suitable for the purpose may be employed without changing the character of my invention.

The provision of a sprocket-wheel with an attached lock for the purpose of locking the sprocket-wheel and chain belt together whenever desired is believed to possess many advantages and substantial utility.

I have only represented a single radially-movable pin or sprocket forming a part of the sprocket-wheel, but obviously any desired number of radially-movable pins or sprockets can be employed and each provided with devices for locking it retracted or projected.

Having thus described my invention, what I claim is—

1. A belt-driving wheel having a radially-movable pin or sprocket, and a suitable lock for locking the pin or sprocket retracted or projected, substantially as and for the purpose described.

2. The combination with a sprocket-wheel for driving a chain belt, of a radially-movable pin or sprocket arranged in a spoke of the wheel, and a lock housed in the spoke of the wheel and constructed to retract or project the pin or sprocket and lock the same retracted or projected, substantially as and for the purpose described.

3. The combination with a sprocket-wheel for driving a chain belt, of a radially-movable pin or sprocket having a rack and pinion engaging the rack, means whereby the pinion may be rotated, and a slidable bolt or dog mounted on the pinion for locking the latter in a fixed position after the pin or sprocket is retracted or projected, substantially as and for the purpose described.

4. The combination with a wheel adapted to drive a belt and having a radially-movable pin or sprocket provided with a rack, of a pinion engaging the rack for retracting or projecting the pin or sprocket, and locking devices for holding the pinion stationary when the pin or sprocket is retracted or projected, substantially as described.

5. The combination with a sprocket-wheel having a chambered spoke, of a radially-movable pin or sprocket arranged in said chambered spoke and provided with a rack, a pinion journaled in the spoke, engaging the rack and adapted to retract or project the pin or sprocket, and a locking bolt or dog carried by the pinion for holding the latter stationary when the pin or sprocket is retracted or projected, substantially as described.

In testimony whereof I have hereunto set my hand in presence of two subscribing witnesses.

JOSEPH ASKINS.

Witnesses:
 THOS. MCCOMB, Jr.,
 GEO. W. JAMES.